United States Patent [19]

Krahn et al.

[11] Patent Number: 4,928,859

[45] Date of Patent: May 29, 1990

[54] QUICK DISCONNECT FOR AEROSOL SPRAY CAN

[76] Inventors: Roy J. Krahn, 3870 E. County Line Rd., Birchwood, Minn. 55110; Brian J. Blenkush, 9921 96th Pl., Maple Grove, Minn. 55369

[21] Appl. No.: 263,717

[22] Filed: Oct. 28, 1988

[51] Int. Cl.$^5$ .................................................. B05B 7/24
[52] U.S. Cl. .............................. 222/402.14; 141/348; 141/382; 137/614.05; 285/317; 222/529
[58] Field of Search ..................... 222/89–91, 222/402.14, 402.15, 402.25, 476, 501, 528–529, 531–532, 537, 567–568; 141/348–350, 366, 382–383, 389; 137/614, 614.05, 614.06; 285/317

[56] References Cited

U.S. PATENT DOCUMENTS

| | | | |
|---|---|---|---|
| 2,929,406 | 3/1960 | Anderson | 137/615 |
| 3,085,601 | 4/1963 | Zellweger | 141/348 X |
| 3,976,110 | 8/1976 | White | 222/402.14 X |
| 4,281,775 | 8/1981 | Turner | 222/82 |
| 4,576,359 | 3/1986 | Oetiker | 251/149.6 |
| 4,703,958 | 11/1987 | Fremy | 285/316 |
| 4,738,401 | 4/1988 | Filicicchia | 239/600 |
| 4,745,948 | 5/1988 | Wilcox et al. | 137/614.05 |
| 4,750,764 | 6/1988 | Gibellina | 285/255 |
| 4,750,765 | 6/1988 | Cassidy et al. | 285/321 |

FOREIGN PATENT DOCUMENTS 229612  10/1963  Austria ............................... 141/348

Primary Examiner—Michael S. Huppert
Attorney, Agent, or Firm—John W. Bunch

[57] ABSTRACT

A quick connect/disconnect assembly (10) comprises a male insert (50) secured to one end of a hose assembly (14), a separate female adapter (52) for attachment to an aerosol can (12), and dual seal arrangement (68, 70) within the adapter, and a releaseable latch (78) for positively interconnecting the insert and adapter. Upon insertion of the male insert (50), leakage of any fluid is contained within the female adapter (52).

20 Claims, 2 Drawing Sheets

QUICK DISCONNECT FOR AEROSOL SPRAY CAN

TECHNICAL FIELD

The present invention relates generally to a coupling device. More particularly, this invention concerns a quick connect/disconnect assembly for interconnecting a hose and a source of fluid under pressure, such as an aerosol can of solvent, with little or no leakage for greater safety.

BACKGROUND ART

Various fluid couplers or coupling devices have been available heretofore. For example, the ordinary garden hose typically includes adapters at both ends. Each adapter generally includes an internally threaded portion, an externally knurled portion to facilitate manually screwing it onto a water spigot or the like, and a gasket therein for sealing. More recently, quick connect/disconnect adapters have been developed for this purpose. Of course, while the water supply is under pressure, a manual valve is provided in the spigot so that it can be turned off during connection or disconnection.

In contrast, aerosol cans of fluid, be it liquid or gas, have no such separate manual valves. Instead, aerosol cans generally include a port at one end that is normally closed off by an internal diaphragm which, when displaced or punctured, allows the pressurized fluid therein to escape through the port. A press nozzle with an actuator pin is typically used for this purpose. Aerosol cans of paint and the like are thus convenient and easy to use, but can present certain difficulties in some applications.

For example, aerosol cans of solvent have been used for years to clean automotive fuel systems. One popular manner of application has been to spray the solvent directly into the throat of a carburetor. This technique, however, cannot be used with fuel injection systems because a closed connection is required. Hose assemblies with a manual on/off valve have been available for this purpose. However, the hose assemblies of the prior art utilize simple threaded connections which can allow excess fluid to escape during connection as well as disconnection, particularly when used by inexperienced or unskilled personnel. This in turn can lead to harmful and even potentially dangerous consequences. It will be understood that solvents of this type are hazardous and extremely flammable.

A need has thus arisen for a new and improved coupling assembly for quickly connecting or disconnecting a hose assembly to an aerosol can without leakage.

SUMMARY OF THE INVENTION

The present invention comprises a coupling assembly which overcomes the foregoing and other difficulties associated with the prior art. In accordance with the invention, there is provided a quick connect/disconnect assembly for interconnecting a hose assembly and an aerosol can, particularly an aerosol can of flammable fluid wherein leakage can present a safety and health hazard. The quick connect/disconnect assembly herein comprises a male insert which is mounted on one end of the hose assembly, and a separate female adapter for mounting on the can. The insert includes a hollow actuator pin and is configured for receipt by an axial bore in the adapter. After the adapter has been mounted on the can and upon insertion of the insert therein, a cylindrical portion of the insert slidably engages a seal arrangement within the adapter as the hollow actuator pin of the insert extends through the adapter and engages the diaphragm in the aerosol can for fluid communication. Any leakage of fluid is minimized and contained within the adapter. A spring-biased latch is provided for releaseably interconnecting the insert and the adapter.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
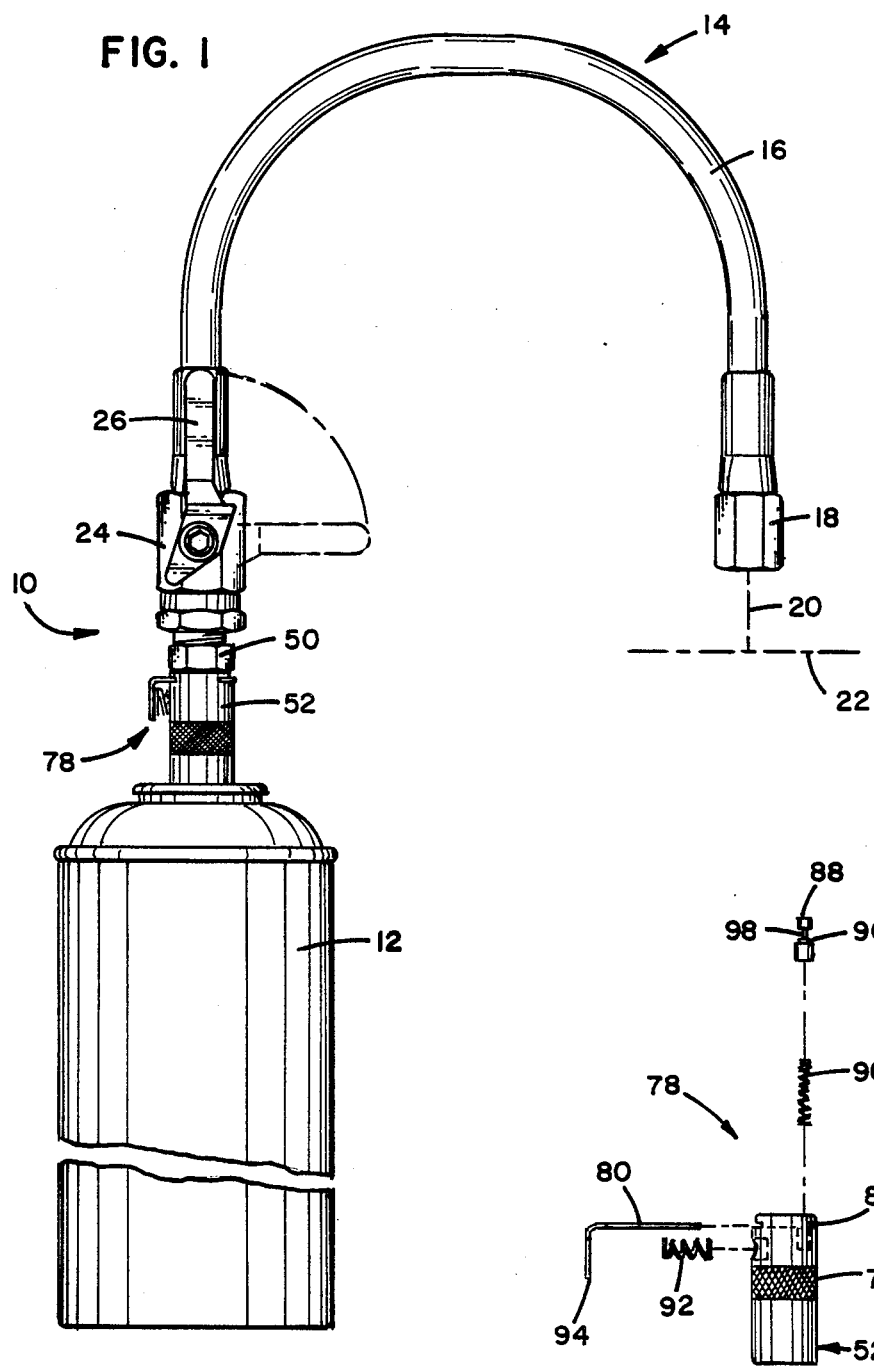
FIG. 1 is a side view of an aerosol can and hose assembly interconnected by the quick connect/disconnect assembly of the invention.

Referring now to the Drawings, wherein like reference numerals designate like or corresponding elements throughout the views, and particularly referring to FIG. 1, there is shown, the quick connect/disconnect assembly 10 of the invention coupled between an aerosol can 12 and a hose assembly 14 of the type used in cleaning automotive fuel systems, for example. The aerosol can 12 contains a suitable solvent and is of substantially conventional construction. A suitable solvent for this purpose can be selected from a wide variety of solvents and includes a mixture of solvents such as a mixture of methanol, diacetone alcohol, toluene, and xylene. The hose assembly 14 is also of substantially conventional construction. Hose assembly 14 includes a suitable length of flexible hose 16, one end of which is connected to a nut or coupling 18 that is adapted to be screwed onto the pressure tap 20 in a fuel rail 22, shown schematically in dotted lines. For example, the hose 16 can be about 21 inches long and be constructed from rubber or other suitable material. The threaded coupling 18 can be constructed of any suitable material, such as metal and preferably brass. The other end of the flexible hose 16 can be connected to another nut or coupling like coupling 18, but is preferably connected to one side of an on/off valve 24. A valve of any suitable construction can be utilized such as that shown in U.S. Pat. No. 2,929,406, the entire disclosure of which is incorporated herein by reference. Valve 24 includes a control handle 26 which can be manually actuated between an open position as shown in solid lines, and a closed position as shown in dotted lines, to control fluid flow in the hose 16.

As will be explained more fully hereinafter, the quick connect/disconnect assembly 10 of the invention allows the hose assembly 14 to be positively connected in fluid communication with the aerosol can 12 with minimal leakage and thus more safety. Although the quick connect/disconnect assembly 10 is particularly adapted for interconnecting an aerosol can and hose assembly, it will be understood that it can be used in other applications.

Figure 2:
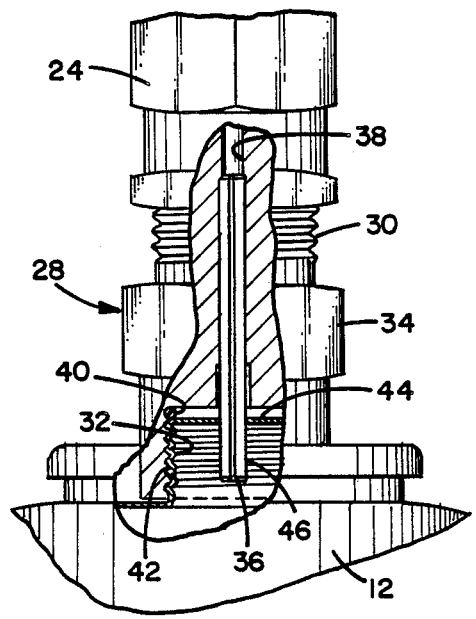
FIG. 2 is an enlarged, partially cutaway view of a prior art device.

FIG. 2 illustrates the manner in which a hose assembly 14 was connected to an aerosol can 12 in the prior art. An adapter 28 was secured to one end of the body of the shutoff valve 24, the end opposite that to which the hose 16 was secured. The adapter 28 included external threads 30 on one end, internal threads 32 on the other end, and wrench flats 34 on an enlarged portion therebetween. A tube or hollow actuator pin 36 was provided by means of an interference fit within an axial bore 38 extending through the adapter 28. The outer end of the hollow pin 36 extended into the end recess containing the internal threads 32, but not beyond the end of the adapter 28. A gasket 40 was also provided therein. However, as the adapter 28 was screwed onto the external threads 42 of the nipple 44, the hollow pin 36 was simultaneously advanced through the axial outlet port 46 and engaged the diaphragm (not shown) in the can allowing fluid to escape before the adapter was fully screwed down with the gasket 40 firmly seated against the end of the nipple. For purposes of clarity, the diaphragm has been omitted. Thus, at least some fluid would be lost. This arrangement was also susceptible to misalignment, cross-threading and thus further leakage. It was also susceptible to over torquing and thus damaging the threads 42 on the can 12. The quick connect/disconnect assembly 10 of the invention avoids these drawbacks.

Figure 5:
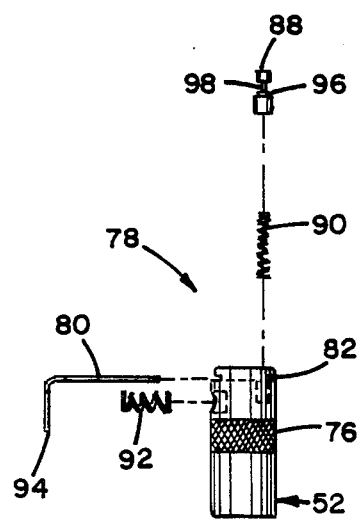
FIG. 5 is an exploded side view of the adapter of the quick connect/disconnect assembly herein.
Figure 3:
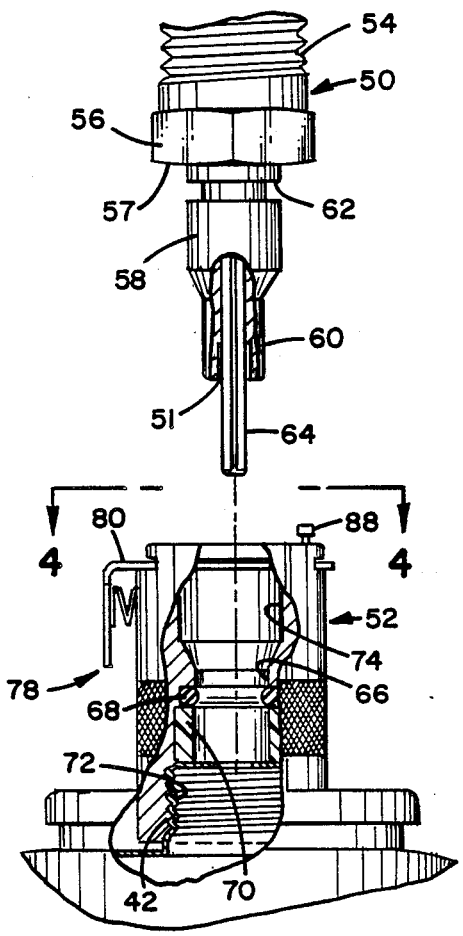
FIG. 3 is an enlarged, partially cutaway exploded side view of the quick connect/disconnect assembly herein.
Figure 4:
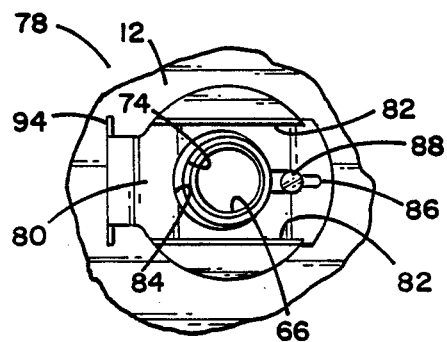
FIG. 4 is a top view of the adapter taken along lines 4—4 of FIG. 3 in the direction of the arrows.

The structural details of the quick connect/disconnect assembly 10 can be seen in FIGS. 3-5. The quick connect/disconnect assembly 10 is a two-part assembly comprising a male insert 50 secured to one end of the hose assembly 14, and a separate female adapter 52 for mounting on the aerosol can 12. In the embodiment shown, the insert 50 can be constructed from any suitable material, such as metal and preferably brass. Insert 50 includes external threads 54 at one end by which it is secured to the valve 24. Wrench flats 56 are provided on an enlarged portion 57 adjacent threads 54, and an intermediate diameter cylindrical portion 58 is provided between a reduced diameter cylindrical portion 60 and the wrench flats. The intermediate diameter portion 58 includes an outside groove 62 for latching purposes as will be explained hereinafter. The insert 50 also includes an axial bore 51 extending therethrough, with a tube or hollow actuator pin 64 fitted therein which extends outwardly from the reduced diameter portion 60 in order to define a fluid passage through the insert. In accordance with the preferred construction, pin 64 comprises a slotted steel spring pin or roll pin.

The female adapter 52 comprises a separate member which is adapted to be screwed onto the nipple 44 of can 12 at one end and for receiving the insert 50 through its other end. A dual seal arrangement is provided within the adapter 52 for defining a sealed connection between nipple 44, insert 50 and the adapter upon insertion of the insert. In particular, the adapter 52 includes an axial bore 66 and an adjacent groove containing an O-ring 68 for slidably receiving in sealing engagement the reduced diameter portion 60 of the insert 50. The O-ring 68 can be made from any suitable polymeric material. Such materials include the fluoroelastomers such as the VITON ® materials available from DuPont and the FLUOREL ® materials available from 3M. These materials are believed to be copolymers of vinylidene fluoride and hexafluoropropylene. In addition, a sleeve gasket 70 is provided between O-ring 68 and the internal threads 72 at one end by which the adapter 52 is screwed onto the nipple 44. At one end, the sleeve gasket 70 abuts and sealingly engages the end of nipple 44 when adapter 52 is mounted thereon such as a polymeric material, and captures the O-ring 68 therein at its other end. The sleeve gasket 70 can be constructed from any suitable material, such as a polymeric material preferably polypropylene. A smooth counterbore 74 is provided at the other end of the adapter 52 for receiving and locating the intermediate diameter portion 58 of the insert 50. The adapter 52 can be constructed from any suitable material, such as metal and preferably brass. A band of knurling 76 is preferably provided to facilitate manually screwing the adapter 52 onto the aerosol can 12.

The insert 50 and adapter 52 are releaseably interconnected by means of a latch 78, which is preferably located on one end of the adapter. Any suitable latch can be used. As illustrated, latch 78 comprises a slide 80 movable in a direction transverse to the axis of the adapter 52 in a guideway defined by a pair of opposing notches 82 undercut into spaced apart raised portions on the end of the adapter. The transverse portion of the slide 80 includes an oblong hole 84 which is movable across the counterbore 74 into and out of registry therewith and simultaneous locking engagement with the groove 62 in the insert 50. The hole 84 includes a notch 86 on one side thereof with portions of different widths for engaging different portions of a locking pin 88 which is normally biased outwardly by a small compression spring 90 seated in an offset blind longitudinal bore as shown in dotted lines in FIG. 5. Similarly, the slide 80 is normally biased outwardly by a compression spring 92 seated between thumb tab 94 and a blind radial bore as also shown in dotted lines in FIG. 5. Thus, when the thumb tab 94 is pressed inwardly against spring 92, the slide 80 is shifted so that hole 84 is generally centered with respect to the counterbore 74 in order to receive the insert 50. Spring 90 urges pin 88 upwardly so that a shoulder 96 on the pin engages the wide portion of notch 86 in order to hold latch 78 open.

After the adapter 52 has been manually screwed onto the can 12, the insert 50 on the hose assembly 14 can then be connected thereto by means of a quick and simple push-on motion. As insert 50 is pushed into the adapter 52, the actuator pin 64 engages the diaphragm (not shown) in can 12; however, any leakage is captured within the adapter. As the insert 50 is pushed into the adapter 52, the raised portion 57 containing the wrench flats 56 comes into contact with the pin 88, which is thus depressed against spring 90 allowing the neck 98 of the pin to register with the notch 86, thereby releasing the slide 80 so that spring 92 can shift it into locking engagement with groove 62 in the insert. When it is desired to release the quick connect/disconnect assembly 10, the thumb tab 94 is pressed to shift slide 80 so that spring 90 extends pin 88 thereby urging the insert and adapter apart.

From the foregoing it will thus be apparent that the present invention comprises an improved quick connect/disconnect assembly having several advantages over the prior art. In contrast to the one-piece devices of the prior art which required screwing one end of the hose assembly onto the aerosol can while at the same time establishing fluid communication, the invention herein utilizes a two-part assembly wherein one part is first screwed onto the can followed by quick axial insertion of the other part through a sealed chamber within the adaptor in order to minimize and capture any leakage. Other advantages will be evident to those skilled in the art.

Although particular embodiments of the invention have been illustrated in the accompanying Drawings, and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

what is claimed is:

1. A quick connect/disconnect assembly for coupling a line to a source of fluid under pressure having a port with a normally closed valve therein, comprising:
    an insert having a threaded portion at one end for connection to the line, a cylindrical male portion at the other end, and an axial first fluid passage extending therebetween;
    a hollow actuator pin positioned in the first fluid passage and extending axially outward from the male end of said insert for extension through the port of the fluid source and engagement with the valve therein;
    an adapter having a cylindrical female portion at one end for receiving said insert, a threaded portion at the other end for connection to the port of the fluid source, and an axial second fluid passage extending therebetween;
    seal means within the second fluid passage of said adapter for defining a sealed connection between said insert, said adapter, and the fluid source upon insertion of said insert into said adapter;
    slide means mounted on the female end of said adapter for transverse movement into and out of locking engagement with a groove on the male end of said insert; and
    means for normally biasing said slide means into locking engagement with the groove on said insert.

2. The quick connect/disconnect assembly of claim 1, wherein the threaded end portion of said insert comprises external threads.

3. The quick/disconnect assembly of claim 1, wherein the hollow actuator pin comprises a longitudinally slotted spring steel pin.

4. The quick connect/disconnect assembly of claim 1, wherein the threaded end portion of said adapter comprises internal threads.

5. The quick connect/disconnect assembly of claim 1, wherein said seal means comprises:
    an O-ring; and
    a sleeve gasket located between said O-ring and the threaded end portion of said adapter.

6. The quick connect/disconnect assembly according to claim 5, wherein said O-ring and said sleeve gasket are each comprised of a polymeric material.

7. The quick connect/disconnect assembly according to claim 6, wherein said O-ring comprises a copolymer of vinylidene fluoride and hexafluoropropylene.

8. The quick connect/disconnect assembly according to claim 7, wherein said sleeve gasket comprises a polymer of propylene.

9. The quick connect/disconnect assembly of claim 1, wherein the cylindrical male end of said insert includes an intermediate diameter portion having the groove therein, a shoulder portion at a first end of the intermediate portion, and a reduced diameter outermost portion extending from the shoulder portion.

10. The quick connect/disconnect assembly of claim 1, further including:
    pin means responsive to insertion of said insert into said adapter for normally holding said slide means for release into locking engagement with the groove in said insert.

11. A quick connect/disconnect assembly for coupling a line to a source of fluid under pressure having a port with a normally closed valve therein, comprising:
    an insert having an externally threaded portion at one end for connection to the line, and an axial first fluid passage extending therebetween;
    a hollow actuator pin positioned in the first fluid passage and extending axially outward from the male end of said insert for extension through the port of the fluid source and engagement with the valve therein;
    an adapter having a cylindrical female portion at one end for receiving said insert, an internally threaded portion at the other end for connection to the port of the fluid source, and an axial second fluid passage extending therebetween;
    an O-ring seated in the second fluid passage of said adapter for slideable sealing engagement with the male end of said insert upon insertion into said adapter;
    a sleeve gasket seated in the second fluid passage of said adapter between said O-ring and the threaded end thereof for abutting sealing engagement with the fluid source;
    said O-ring and sleeve gasket each being comprised of a polymeric material;
    slide means mounted on the female end of said adapter for transverse movement into and out of locking engagement with a groove on the male end of said insert; and
    means for normally biasing said slide means into locking engagement with the groove on said insert.

12. The quick connect/disconnect assembly of claim 11, wherein said O-ring comprises a co-polymer of vinylidene fluoride and hexafluoropropylene.

13. The quick connect/disconnect assembly of claim 11, wherein said sleeve gasket is comprised of polymers of propylene.

14. The quick connect/disconnect assembly of claim 11, wherein the cylindrical male end portion of said insert includes a cylindrical base portion having a groove therein, a shoulder portion at a first end of the cylindrical base portion, and a reduced diameter cylindrical portion extending from the shoulder portion.

15. The quick connect/disconnect assembly according to claim 14, wherein said interconnect means further comprises:
    a slide mounted for transverse movement across the cylindrical female end portion of said adapter, said slide being movable into and out of locking engagement with the groove on said insert;
    means for normally biasing said slide into locking engagement with the groove on said insert; and
    means responsive to insertion of said insert into said adapter, which means normally holds said slide for selective release into engagement with the groove in said insert.

16. Apparatus for cleaning an automotive fuel injection system, comprising:
    an aerosol can of solvent including a fluid discharge port with a normally closed valve therein;

a hose having opposite ends, one end being adapted for connection to the fuel injection system;

an on/off valve connected between the ends of said hose;

a male insert secured to the other end of said hose, said insert including a first fluid passage therein and a hollow actuator pin extending axially outward therefrom for extension through the port of the fluid source and engagement with the valve therein;

a female adapter secured to the discharge port of said aerosol can, said adapter including a second fluid passage therein;

seal means within the second fluid passage of said adapter for defining a sealed connection between said insert, adapter, and discharge port of said aerosol can upon insertion of said insert into said adapter;

slide means mounted on the female end of said adapter for transverse movement into and out of locking engagement with a groove on the male end of said insert; and means for normally biasing said slide means into locking engagement with the groove on said insert.

17. The quick connect/disconnect assembly of claim 16, wherein said seal means comprises:

an O-ring; and a sleeve gasket located between said O-ring and the threaded end portion of said adapter.

18. The quick connect/disconnect assembly according to claim 17, wherein said O-ring and said sleeve gasket are both comprised of polymeric materials.

19. The quick connect/disconnect assembly according to claim 18, wherein said O-ring comprises a copolymer of vinylidene fluoride and hexafluoropropylene.

20. The quick connect/disconnect assembly according to claim 18, wherein said sleeve gasket comprises a polymer of propylene.

* * * * *